United States Patent
Hughes et al.

(10) Patent No.: US 8,917,680 B2
(45) Date of Patent: Dec. 23, 2014

(54) SYSTEM AND METHOD FOR RESERVING CHANNELS FOR HIGH PRIORITY PACKETS

(75) Inventors: Sterling Hughes, Oakland, CA (US); Jana Van Greunen, Woodside, CA (US); William E. San Filippo, III, Los Altos Hills, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 202 days.

(21) Appl. No.: 13/335,845

(22) Filed: Dec. 22, 2011

(65) Prior Publication Data

US 2013/0163523 A1 Jun. 27, 2013

(51) Int. Cl.
*H04W 4/00* (2009.01)
*H04B 1/713* (2011.01)
*H04W 72/10* (2009.01)

(52) U.S. Cl.
CPC .............. *H04W 72/10* (2013.01); *H04B 1/713* (2013.01)
USPC .......................................... 370/329; 370/341

(58) Field of Classification Search
CPC ... H04W 72/00; H04W 7/10; H04W 72/1226; H04W 72/1247; H04W 72/1257; H04W 72/1294; H04B 1/713
USPC ......... 370/278, 281, 319, 322, 329, 341, 344, 370/345, 348, 350, 437, 443–444, 522; 375/132–133, 260, 349, 362
See application file for complete search history.

(56) References Cited

U.S. PATENT DOCUMENTS

| 6,647,002 | B1 | 11/2003 | Suda et al. |
| 7,469,297 | B1 | 12/2008 | Kostoff et al. |
| 2001/0037398 | A1 | 11/2001 | Chao et al. |
| 2004/0205105 | A1 | 10/2004 | Larsson et al. |
| 2005/0058149 | A1 | 3/2005 | Howe |
| 2005/0210157 | A1 | 9/2005 | Sakoda |
| 2005/0281220 | A1 * | 12/2005 | Stanwood et al. ............ 370/328 |
| 2007/0004347 | A1 | 1/2007 | Sondur |
| 2007/0147385 | A1 * | 6/2007 | Druke et al. .................. 370/394 |

(Continued)

FOREIGN PATENT DOCUMENTS

| EP | 0981221 A2 | 2/2000 |
| EP | 1895701 A2 | 3/2008 |
| WO | 0182550 A2 | 11/2001 |

OTHER PUBLICATIONS

Invitation to pay Additional Fees, with Partial Search Report, dated Mar. 26, 2012.

(Continued)

*Primary Examiner* — Ricky Ngo
*Assistant Examiner* — Kabir Jahangir
(74) *Attorney, Agent, or Firm* — Patterson & Sheridan, LLP

(57) ABSTRACT

One embodiment of the present invention implements a FHSS system using single transmitter/multiple receiver transceivers. Such transceivers are configured to receive multiple FHSS channels (e.g., five channels) but only transmit on one channel. In an embodiment, one channel is dedicated to high priority traffic and the other four channels are dedicated to standard traffic. In receiving a high priority message, the transceiver is configured to address the high priority traffic first. For example, because the single transmitter/multiple receiver transceivers only has one transmitter, such transceiver may immediately dedicate it transmitting resources to addressing the received high priority data. Other embodiments are disclosed that implement multiple priorities among a plurality of communication channels.

24 Claims, 8 Drawing Sheets

(56) References Cited

U.S. PATENT DOCUMENTS

| | | |
|---|---|---|
| 2008/0004044 A1 | 1/2008 | Simpson et al. |
| 2008/0068979 A1 | 3/2008 | Visotsky et al. |
| 2011/0134868 A1* | 6/2011 | Lee et al. .................. 370/329 |

OTHER PUBLICATIONS

International Search Report and Written Opinion, dated May 25, 2010.

* cited by examiner

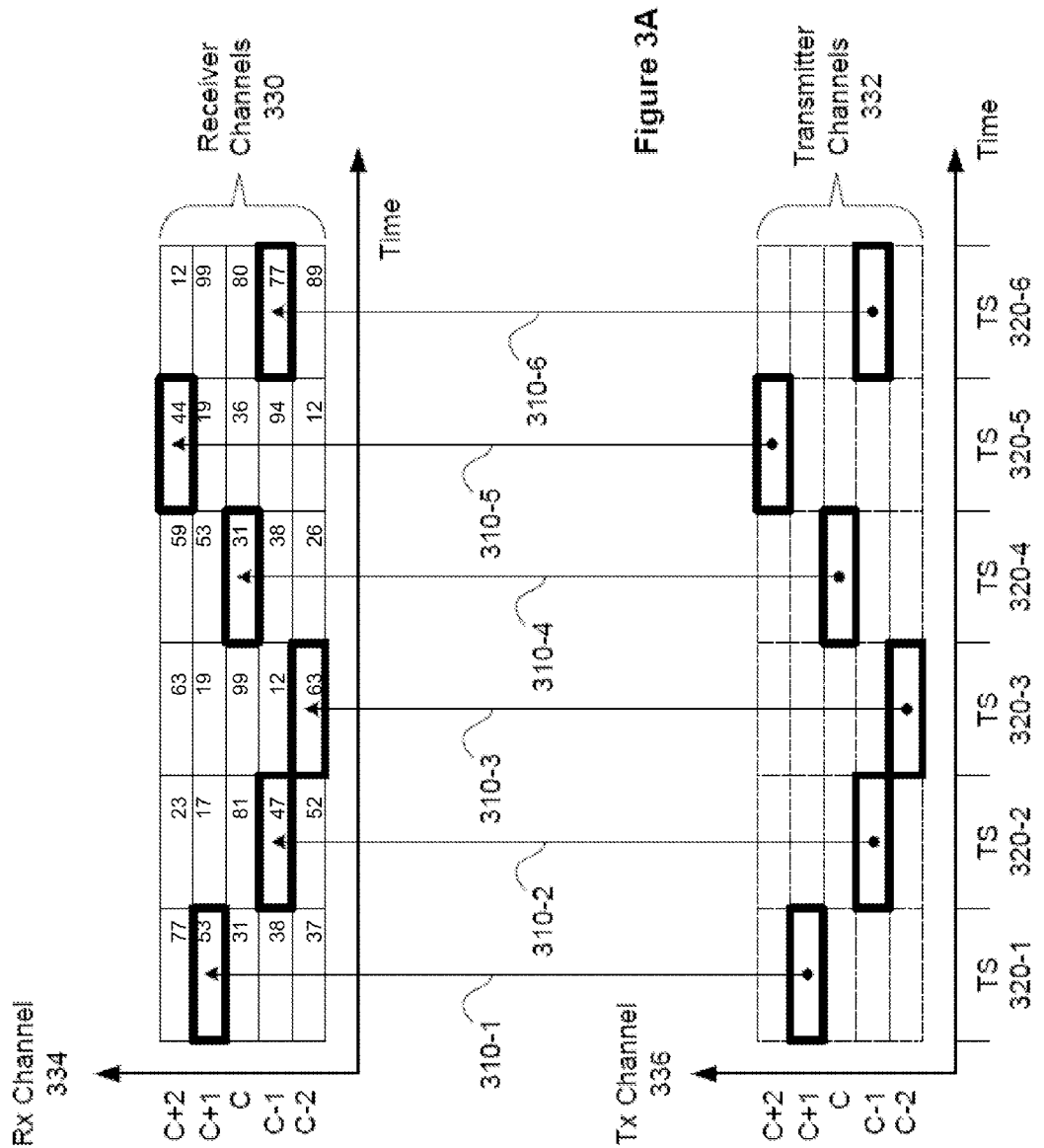

SYSTEM AND METHOD FOR RESERVING CHANNELS FOR HIGH PRIORITY PACKETS

BACKGROUND

1. Technical Field

Embodiments of the present invention relate generally to wireless digital communication technology, more specifically, to a system and method for reserving channels for high priority packets.

2. Description of the Related Art

A conventional wireless mesh network includes a plurality of nodes, each incorporating a digital radio transceiver. A given node may transmit payload data to one or more other nodes via the digital radio transceiver. The node may originate the payload data or forward the payload data on behalf of a different node. Similarly, a given node may receive the payload data from a different node to be processed or forwarded by the node. The wireless mesh network may include an arbitrary number of nodes and may include certain access points, configured to bridge data communications within the mesh network to a related service system, such as a wire line or optical communications network.

The digital radio transceiver may implement specific modulation and spectral utilization techniques to satisfy a particular set of technical requirements. For example, multi-channel frequency hopping spread spectrum (FHSS) may be implemented to avoid potentially excessive interference among nodes that are attempting to transmit on a common radio frequency channel in an arbitrary window of time. FHSS involves transmitting data on one radio frequency channel for up to a specified maximum time duration and subsequently transmitting on a different radio frequency channel for up to another specified maximum time duration. FHSS systems typically follow a specific channel hop sequence, which both the transmitter and receiver need to follow to maintain a reliable communications channel. The transmitter reduces average radio frequency energy associated with a given channel by hopping to a different channel after a specified maximum time duration, thereby reducing a probability of interference among nodes attempting to transmit on the same channel.

FHSS systems conventionally require the transmitter and receiver pair to be synchronized, which is typically accomplished via a synchronization procedure conducted between the transmitter and receiver. Overhead associated with the synchronization procedure and related transmission latencies can substantially reduce overall transmission efficiency and network throughput.

One challenge in implementing a wireless mesh network is achieving sufficient overall throughput and latency specifications. Overall throughput and latency are generally a function of overall utilization, link error rates, link bandwidth, and link transmission latency. As utilization increases, channel collision probabilities increase, leading to multiple dropped packets, which in turn result in additional overall utilization from transmission retry mechanisms. FHSS in wireless mesh networks offers certain benefits, including regulatory compliance in certain scenarios. However, inefficiencies associated with FHSS, such as transmission latency and synchronization overhead can significantly diminish overall network throughput and increase average link transmission latencies. In certain wireless mesh network applications, FHSS is required by prevailing regulations and overall network throughput and average latencies suffer from the above described inefficiencies.

Still another challenge in a FHSS wireless mesh environment is that high priority data may be handled in the same manner as other standard data. For example, in Aloha applications, standard priority transmissions are not distinguished from high-priority transmission.

Aloha has been used for packet radio environments where it is used with a particular Medium Access Control (MAC) protocol. As part of the MAC, every node is configured to hear every other node. Also, nodes that have data to transmit, begin their transmissions within predetermined slots. To address the issue that collisions in data transmission can occur, each node is able to detect a transmission failure. If a transmission failure occurs, the transmission is corrupted, but each transmitting node is able to detect the transmission failure. In response, each transmitting node re-transmits their respective data after waiting a random amount of time. In certain applications, the wait time is chosen according to a geometric statistical distribution that is independent from the number of transmissions. It is important that each of the transmitting nodes wait a different amount of time so as to avoid a transmission failure in the re-transmissions.

In an Aloha application, however, standard transmissions are not distinguished from high priority transmissions such that in a situation where a transmission failure occurs, a high priority message could wait a longer time for retransmission than would a standard priority message. In such a conventional implementation, the system (e.g., Aloha system) is not able to immediately address high priority messages that may be important for the integrity of the entire system or may be important from a business perspective.

As the foregoing illustrates, what is needed in the art is a more efficient technique for transmission in a wireless network environment.

SUMMARY

One embodiment of the present invention implements an FHSS mesh network using single transmitter/multiple receiver transceivers. Such transceivers are configured to receive multiple channels (e.g., five channels) but only transmit on one channel. In an embodiment, one channel is dedicated to high priority traffic and the other four channels are dedicated to standard traffic. In receiving a high priority message, the transceiver is configured to address the high priority traffic first. For example, because the single transmitter/multiple receiver transceivers only has one transmitter, such transceiver may immediately dedicate it transmitting resources to addressing the received high priority data. Other embodiments are disclosed that implement multiple priorities among a plurality of communication channels.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A illustrates frequency hopping transmission that targets a multi-channel receiver, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
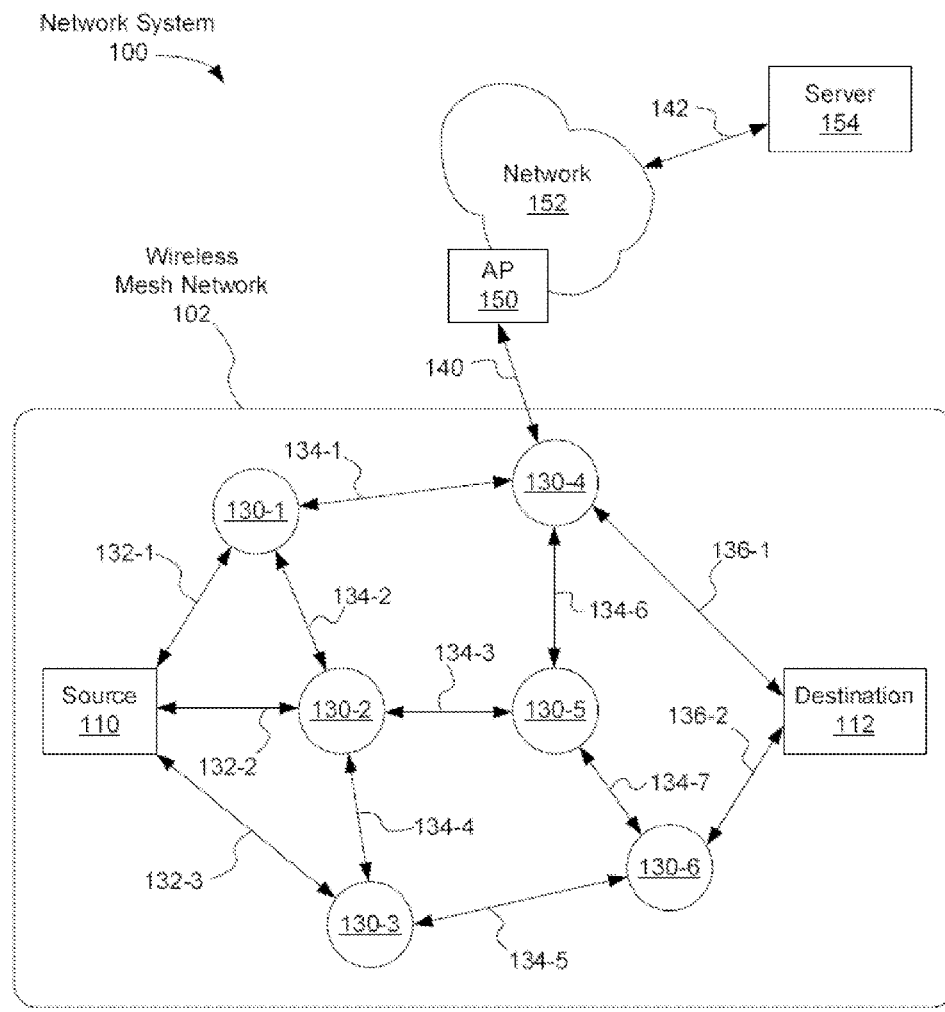
FIG. 1 illustrates a general wireless mesh network configured to implement one or more aspects of the present invention.

FIG. 1 illustrates a network system 100, configured to implement one or more aspects of the present invention. The network system 100 comprises a wireless mesh network 102, which may include a source node 110, intermediate nodes 130 and destination node 112. In an embodiment, wireless mesh network 102 is implemented as an Aloha system but could be implemented in other ways as would be known to those of ordinary skill in the art. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 100 may also include an access point 150, a network 152, and a server 154.

A discovery protocol may be implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, assuming a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address. Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address each of the multiple paths may include one or more cost values. Any technically feasible type of cost value may characterize a link or a path within the network system 100. In one embodiment, each node within the wireless mesh network 102 implements substantially identical functionality and each node may act as a source node, destination node or intermediate node.

As shown, the access point 150 is configured to communicate with at least one node within the wireless mesh network 102, such as intermediate node 130-4. Communication may include transmission of payload data, timing data, or any other technically relevant data between the access point 150 and the at least one node within the wireless mesh network 102. For example, communications link 140 may be established between the access point 150 and intermediate node 130-4 to facilitate transmission of payload data between wireless mesh network 102 and network 152. The access point 150 is coupled to the network 152, which may comprise any wired, optical, wireless, or hybrid network configured to transmit payload data between the access point 150 and the server 154. In one embodiment, the server 154 represents a destination for payload data originating within the wireless mesh network 102 and a source of payload data destined for one or more nodes within the wireless mesh network 102. In one embodiment, the server 154 executes an application for interacting with nodes within the wireless mesh network 102. For example, nodes within the wireless mesh network 102 may perform measurements to generate measurement data, such as power consumption data. The server 154 may execute an application to collect the measurement data and report the measurement data. In one embodiment, the server 154 queries nodes within the wireless mesh network 102 for certain data. Each queried node replies with requested data, such as consumption data, system status and health data, and so forth. In an alternative embodiment, each node within the wireless mesh network 102 autonomously reports certain data, which is collected by the 154 as the data becomes available via autonomous reporting.

FIG. 2 illustrates a digital radio transceiver 200 configured to implement multi-channel operation, according to one embodiment of the invention. Each node 110, 112, 130 within the wireless mesh network 102 of FIG. 1 includes at least one instance of the digital radio transceiver 200. The digital radio transceiver 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage.

In one embodiment, the MPU 210 implements procedures for processing IP packets transmitted or received as payload data by the digital radio transceiver 200. The procedures for processing the IP packets may include, without limitation, wireless routing, encryption, authentication, protocol translation, and routing between and among different wireless and wired network ports. The MPU 210 may also implement a packet transmission protocol, such as a four step transmission protocol discussed in greater detail below in FIGS. 4A and 4B. Alternatively, the DSP 214 may implement the four step transmission protocol.

The DSP 214 implements signal processing procedures for modulating a serialized representation of payload data comprising IP packets for wireless transmission. The serialized representation may encode one or more bits of payload data per modulation symbol. A receiver may demodulate each modulation symbol to recover the one or more bits of payload data. In one embodiment the one or more bits of payload data are used to generate a corresponding IP packet. The DSP 214 may also implement multi-channel modulation for simultaneous transmission of independent units of payload data via multiple, independent channels. Each independent channel occupies a different frequency range in a frequency domain representation of a transmitted radio signal. The DSP 214 also implements signal processing procedures for receiving payload data, such as payload data comprising IP packets. The procedures may include, without limitation filtering, energy detection, signal characterization, and simultaneous demodulation of multiple, independent channels.

In one embodiment, the DSP 214 is configured to modulate data within a given channel using a particular modulation technique that is selected form a set of different modulation techniques, based on prevailing channel requirements. For a given packet of data, a particular transmission bit rate may be implemented using one of the different modulation techniques, based on channel conditions. For example, if a selected channel is subjected to a relatively large amount of noise, then a lower bit rate modulation technique that is more tolerant of noise may be selected. Alternatively, if a selected channel is subjected to relatively low noise and low loss, then a higher bit rate modulation technique may be selected despite a potentially reduced noise tolerance. Exemplary modulation techniques known in the art include, without limitation, frequency shift keying (FSK) and quadrature amplitude modulation (QAM). FSK may be implemented as a robust, but relatively low bit rate technique for representing one or more bits of data per modulation symbol as signal energy in at least one of two or more defined frequency bands. QAM may be implemented as a relatively high bit rate technique for representing a set of two or more bits per modulation symbol within an amplitude-phase space. Each possible value represented by the two or more bits is mapped to a unique region within the amplitude-phase space. A collection of regions within the amplitude-phase space is known as a constellation. During modulation, each set of two or more bits comprising a modulation symbol is encoded and mapped to an appropriate region within a corresponding constellation. Persons skilled in the art will understand that quadrature encoded signal pairs may be used to conveniently implement QAM modulation. Furthermore, any technically feasible modulation, demodulation, filtering, energy detection, and signal characterization techniques may be implemented by the DSP 214 without departing the scope and spirit of embodiments of the present invention.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, the DSP 214 generates two modulated streams of outbound digital values, which are converted to corresponding analog quadrature signals by DACs 220, 221. The analog quadrature signals are separately mixed with a radio frequency (RF) carrier signal by analog mixers 224, 225 to generate corresponding quadrature RF signals, each having a frequency domain image centered about the frequency of the RF carrier signal. Oscillator 230 generates the RF carrier signal and phase shifter 232 generates a 90-degree shifted representation of the RF carrier signal for generating quadrature RF signals. The PA 242 combines the quadrature RF signals to generate a modulated RF signal, which is coupled through the antenna switch 244 to the antenna 246. The antenna 246 converts the modulated RF signal form an electrical representation to an electromagnetic representation for wireless transmission. The wireless transmission may be directed to a different instance of the digital radio transceiver 200, residing within a different node of the wireless mesh network 102.

When the digital radio transceiver 200 is receiving data, the antenna 246 converts an incoming electromagnetic RF signal to an electrical RF signal, which is coupled through the antenna switch 244 to the LNA 240. The LNA 240 amplifies the electrical RF signal and couples the amplified RF signal to analog mixers 226 and 227. The amplified RF signal is characterized as having a signal image centered about an RF carrier frequency. The analog mixer 227 shifts the signal image down in frequency to an in-phase baseband component of the signal image. The signal is in-phase with respect to the RF carrier signal generated by oscillator 230. The analog mixer 226 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. The DSP 214 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, the oscillator 230 can be programmed to generate one selected frequency from a plurality of possible frequencies. Each of the plurality of frequencies corresponds to a different channel. The selected frequency determines a center channel for a range of channels that are concurrently available to the DSP 214 or receiving or transmitting data. For example, if a frequency range of 5 MHz defines fifty channels, and each channel is allocated a bandwidth of 100 KHz, then the selected frequency determines a center channel for five concurrently available channels that are adjacent in frequency. In this example, a frequency range of 500 KHz from the overall frequency range of 5 Mhz is processed by the DSP 214 for transmitting or receiving data on one or more of the five channels. If the oscillator 230 is programmed to generate a different selected frequency, then a different set of five concurrently available channels may be used for transmitting or receiving data. The center channel may be changed arbitrarily by programming the oscillator 230 independently of the DSP 214 operating on the concurrently available channels. The digital radio transceiver 200 may be configured with an arbitrary number of concurrently available channels, each having an arbitrary bandwidth without departing the scope and spirit of embodiments of the present invention.

FIG. 3A illustrates frequency hopping transmission that targets a multi-channel receiver, according to one embodiment of the present invention. A set of five concurrent receiver channels 330 is selected, for example by programming oscillator 230 of FIG. 2 to establish receiver channel "C" as the center channel for five channels denoted as C−2, C−1, C, C+1, C+2. Similarly, an identical set of five transmitter channels 332 is selected and denoted as C−2, C−1, C, C+1, C+2. The center channel, C, maps to a particular wireless transmission frequency via the frequency of the RF carrier signal generated by oscillator 230.

A first instance of the digital radio transceiver 200 is configured to operate as a transmitter, and a second instance of the digital radio transceiver 200 is configured to operate as a receiver. The transmitter may transmit an RF signal on a particular transmitter channel 336 within a time span (TS) 320. Each time span 320 may be specified as a maximum transmission time, after which the transmitter must hop to a different channel to continue transmitting. In one embodiment, the transmitter is configured to transmit on one channel in any given time span 320. In other embodiments, the transmitter is configured to concurrently transmit on two or more channels in a given time span 320.

The receiver is configured to monitor each receiver channel C−2 through C+2 within the set of five concurrent receiver channels 330. If a data bearing signal is received on one of the concurrent receiver channels 330, then the receiver demodulates the signal into a serial data stream. In one embodiment, the serial data stream is parsed and collected into an IP packet, which is processed by the MPU 210. If two or more data bearing signals are received, each on a separate channel, then each one of the two or more data bearing signals is similarly demodulated into an independent serial data stream. In one embodiment, the set of concurrent receiver channels 330 is nominally identical to the set of transmitter channels 332. In alternative embodiments, the set of concurrent receiver channels 330 may be a superset of the transmitter channels 332.

As shown, the transmitter frequency-hops in a particular channel sequence. In this example, the channel sequence is {C+1, C−1, C−2, C, C+2, C−1} in time spans 320-1, 320-2, 320-3, 320-4, 320-5, and 320-6, respectively. Payload data 310-1, 310-2, 310-3, 310-4, 310-5, and 310-6 is transmitted in time spans 320-1, 320-2, 320-3, 320-4, 320-5, and 320-6, respectively. In one embodiment, payload data 310 transmitted in a given time span 320 comprises at least a portion of an IP packet, such as a whole IP packet or an IP packet fragment.

In one embodiment, each communication link 132, 134, 136, 140 of FIG. 1 is established with a persistent center channel during execution of the discover protocol. In alternative embodiments, a center channel is established dynamically in response to prevailing transmission conditions. Persons skilled in the art will recognize that any technically feasible technique may be implemented to establish a consistent center channel C for the transmitter and receiver without departing the scope and spirit of embodiments of the present invention.

Figure 3B:
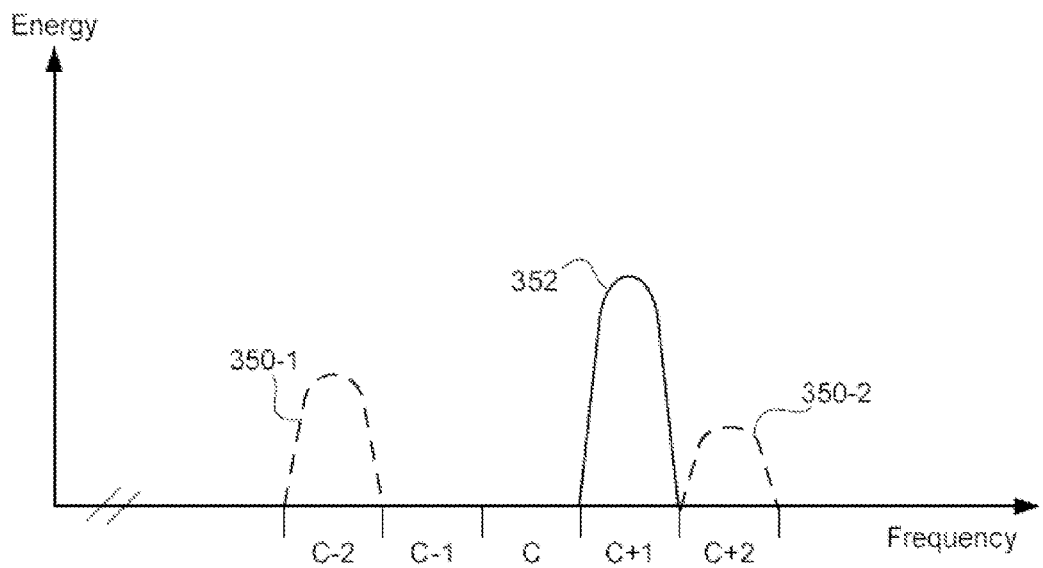
FIG. 3B represents energy within a group of channels for one time span, according to one embodiment of the present invention.

FIG. 3B represents energy within a group of channels for one time span, according to one embodiment of the present invention. As shown, a frequency domain image 352 represents energy associated with channel C+1 during time span 320-1 of FIG. 3A. The receiver is configured to characterize the other frequency domain images 350 to determine whether they represent data bearing signals and should be processed by the receiver or ignored. If one of the frequency domain images 350 is a data bearing signal, then the receiver determines a type for the data bearing signal and demodulates the data bearing signal based on the type. The type may define a modulation technique, bit rate, or any other technically feasible signal characteristic.

Figure 3C:
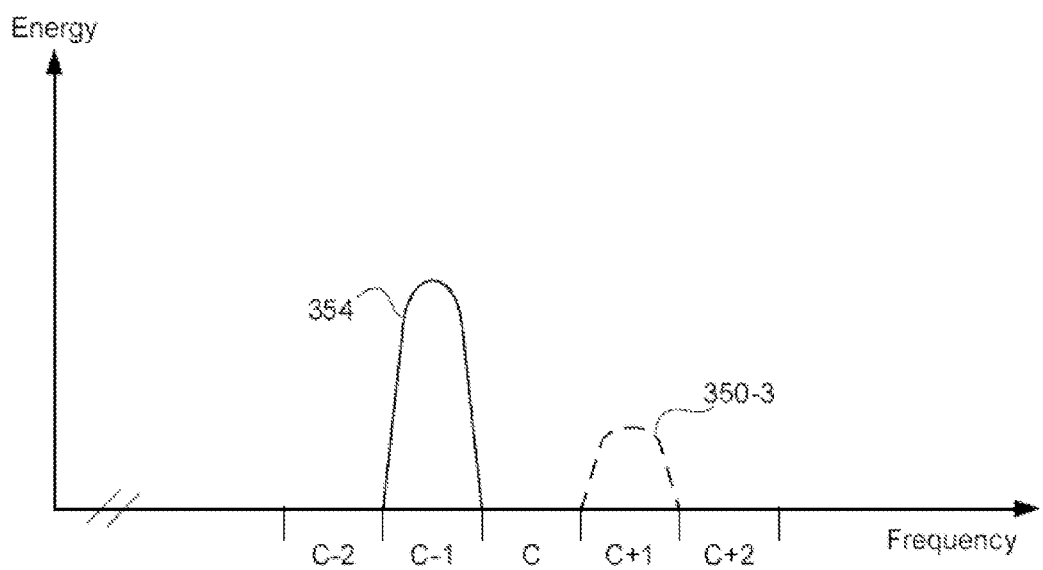
FIG. 3C represents energy within the group of channels for another time span, according to one embodiment of the present invention.

FIG. 3C represents energy within the group of channels for another time span, according to one embodiment of the present invention. As shown, a frequency domain image 354 represents energy associated with channel C−1 during time span 320-2 of FIG. 3A. Frequency domain image 350-3 may represent interference, noise, or a data bearing signal that should be processed.

Figure 2A:
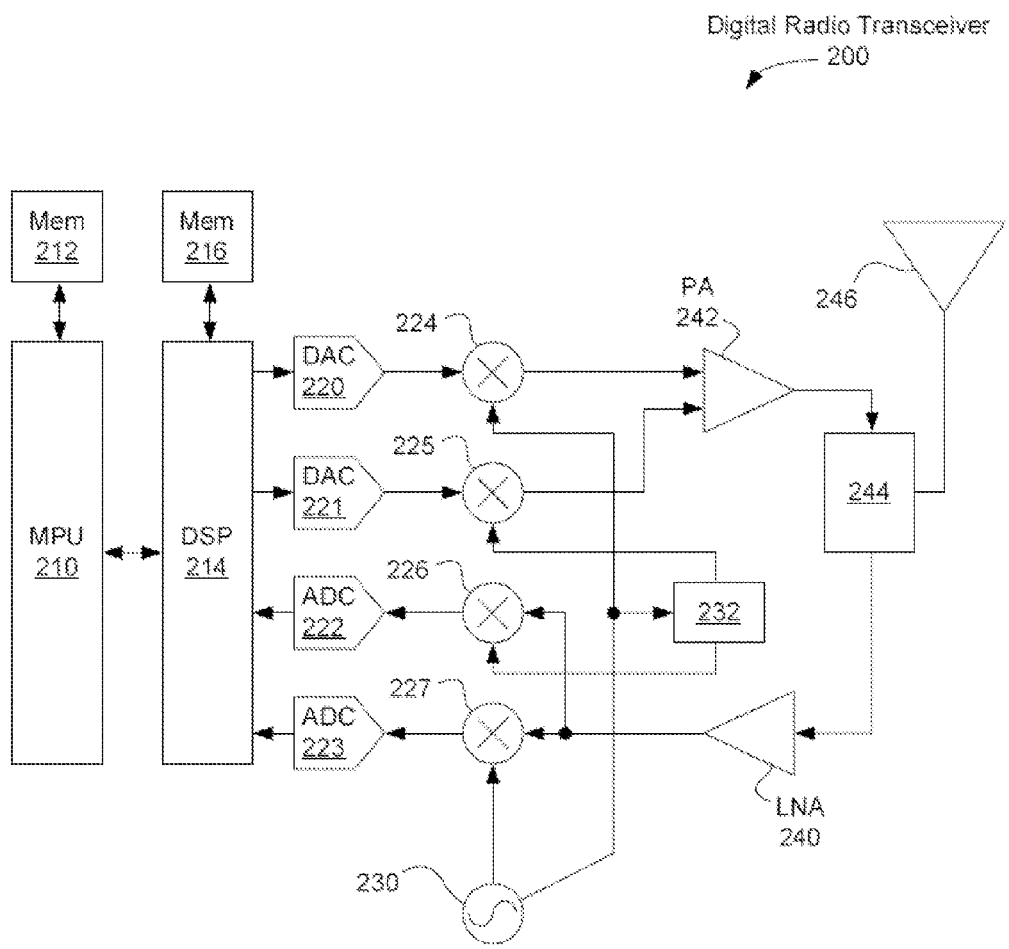
FIG. 2A illustrates a radio transceiver configured to implement multi-channel operation using a single transmitter and a single receiver, according to one embodiment of the invention.
Figure 2B:
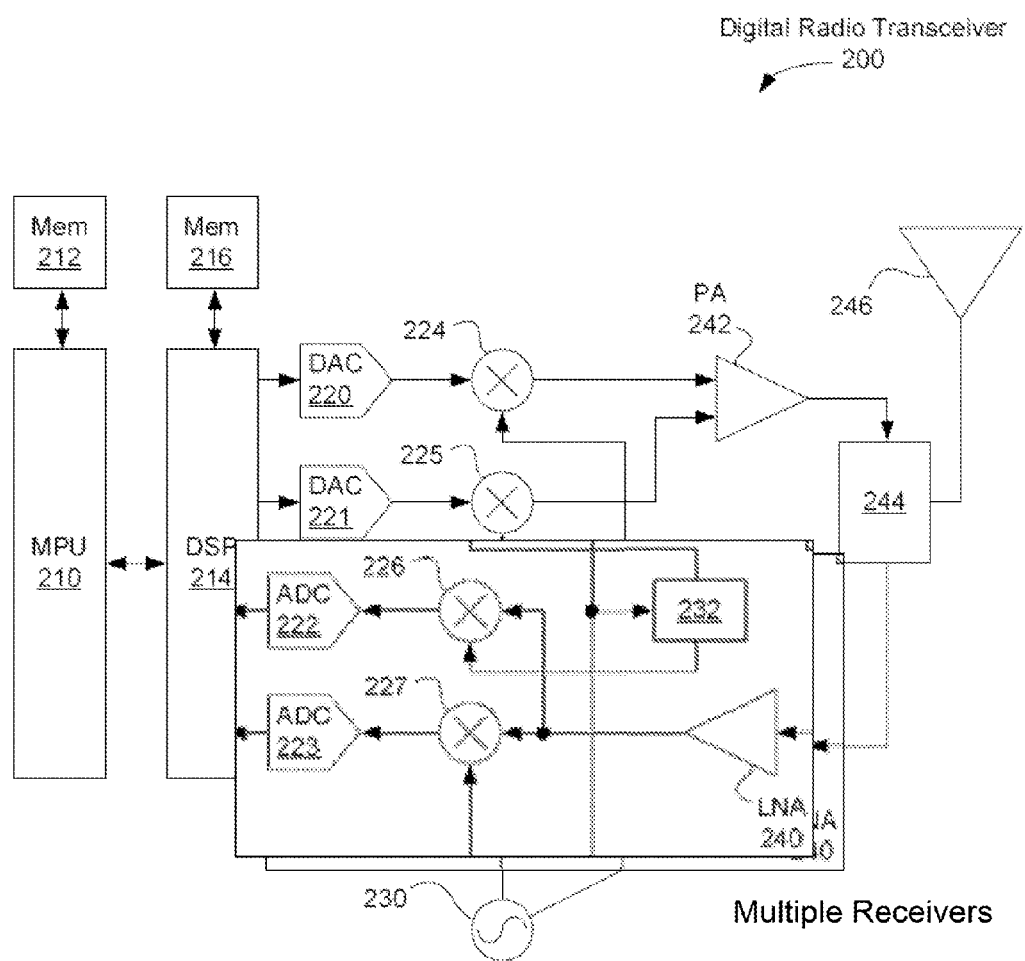
FIG. 2B illustrates a radio transceiver configured to implement multi-channel operation using a single transmitter and a multiple receivers, according to one embodiment of the invention.

As shown in FIG. 2A, transceiver 200 is implemented as a single transmitter/single receiver configuration. It should be noted, however, that a transceiver can also be implemented as a single transmitter/multi-receiver configuration. As shown in FIG. 2B, transceiver 250 is substantially similar to transceiver 200 with regard to components used to transmit a signal, e.g., DAC 220, DAC 221, oscillator 230, mixers 224, mixer 225, PA 242, antenna switch 244, and antenna 246. In order to implement a multi-receiver configuration, however, transceiver 250 implements multiple receiving units that each include LNA 240, phase shifter 232, mixer 226, mixer 227, ADC 222, and ADC 223. For implementation of the multi-channel receiver, modifications may need to be made to DSP 214, MPU 210, memory 212, and memory 216 as would be known to those of skill in the art. As shown, transceiver 250 is configured to receive five separate channels, but many other variations are possible as would be known to those of ordinary skill in the art.

In a corresponding way, a multi-transmitter transceiver (not shown) could also be implemented by incorporating multiple instances of the transmitting components, e.g., DAC 220, DAC 221, oscillator 230, mixers 224, mixer 225, and PA 242 and making appropriate modifications to DSP 214, MPU 210, memory 212, and memory 216 as would be known to those of ordinary skill in the art.

Figure 3D:
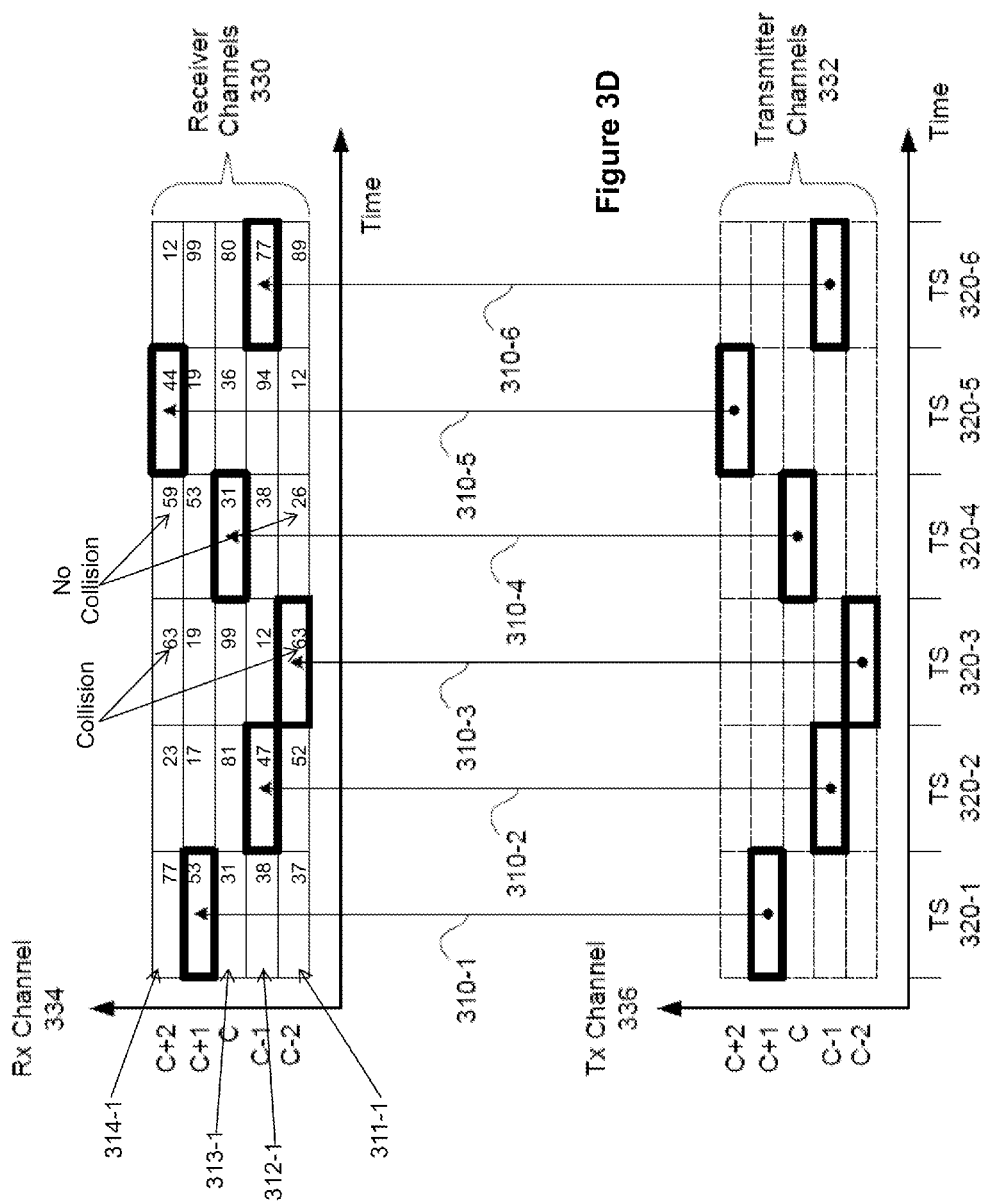
FIG. 3D illustrates frequency hopping transmission in a single transmitter/multiple receiver transceiver, according to one embodiment of the present invention.

In operation, the transmitting portion of transceiver 250 operates substantially the same as the transmitting portion of transceiver 200 as shown in FIG. 3D. For example, the transmitter of transceiver 250 may transmit an RF signal on a particular transmitter channel 336 within a time span (TS) 320. Each time span 320 may be specified as a maximum transmission time, after which the transmitter must hop to a different channel to continue transmitting. In one embodiment, the transmitter is configured to transmit on one channel in any given time span 320. In other embodiments, the transmitter is configured to concurrently transmit on two or more channels in a given time span 320.

As shown in FIG. 3D, for a first single transmitter/multi-receiver transceiver 250, the transmitter portion of transceiver 250 performs frequency hops in a particular channel sequence. In the example of FIG. 3D as implemented in an Aloha system, the channel sequence is {C+1, C−1, C−2, C, C+2, C−1} in time spans 320-1, 320-2, 320-3, 320-4, 320-5, and 320-6, respectively as shown in the bolded boxes. Payload data 310-1, 310-2, 310-3, 310-4, 310-5, and 310-6 is transmitted in time spans 320-1, 320-2, 320-3, 320-4, 320-5, and 320-6, respectively. In one embodiment, payload data 310 transmitted in a given time span 320 comprises at least a portion of an IP packet, such as a whole IP packet or an IP packet fragment.

A single transmitter/multi-receiver transceiver 250, however, is able to receive information from various transmitters. As shown in FIG. 3D for the first time span 320-1, transceiver 250 is able to receive payload data 310-1, 311-1, 312-1, 313-1, and 314-1 from five separate transmitters using the multiple receivers described with reference to FIG. 2B. This type of operation can be repeated at every time slot 320-1, 320-2, 320-3, 320-4, 320-5, and 320-6 but is not depicted in FIG. 3D so as not to distract from the present teachings.

Further shown in FIG. 3D within the channel/time slots are numbers representing the frequency hop sequences for an Aloha implementation where the a given transmitter and receiver pair follow a specific channel hop sequence so as to maintain a reliable communications channel.

In an embodiment, all traffic, whether high priority or low priority traffic, is allowed to use any of channels C−2, C−1, C, C+1, C+2. In such an implementation, however, there may not be a manner by which to give preference to a high priority message. In an Distribution Automation application, a high priority message can be a message indicating that a power outage has just occurred. This is a type of message that can be very important to address immediately. For example, in response to such a message, certain systems may need to be immediately powered down while certain other procedures need to be immediately initiated. If such a high priority message is stuck in a long queue, however, it may not reach its destination in a timely manner so that it can be acted upon properly.

So as to allow high priority messages to be addressed more immediately, an embodiment of the present invention dedicates at least one channel (e.g., one of C−2, C−1, C, C+1, C+2) for high priority messages. As an example, consider an embodiment where channel C+2 is dedicated to high priority messages and channels C−2, C−1, C, and C+1 are used for other ordinary traffic. In such an embodiment, the various transmitters choose channels C−2, C−1, C, and C+1 for transmission of standard information. But where a high priority message arises, a transmitter chooses the high priority channel, C+2 in this embodiment, for transmission of the high priority message.

Figure 3E:
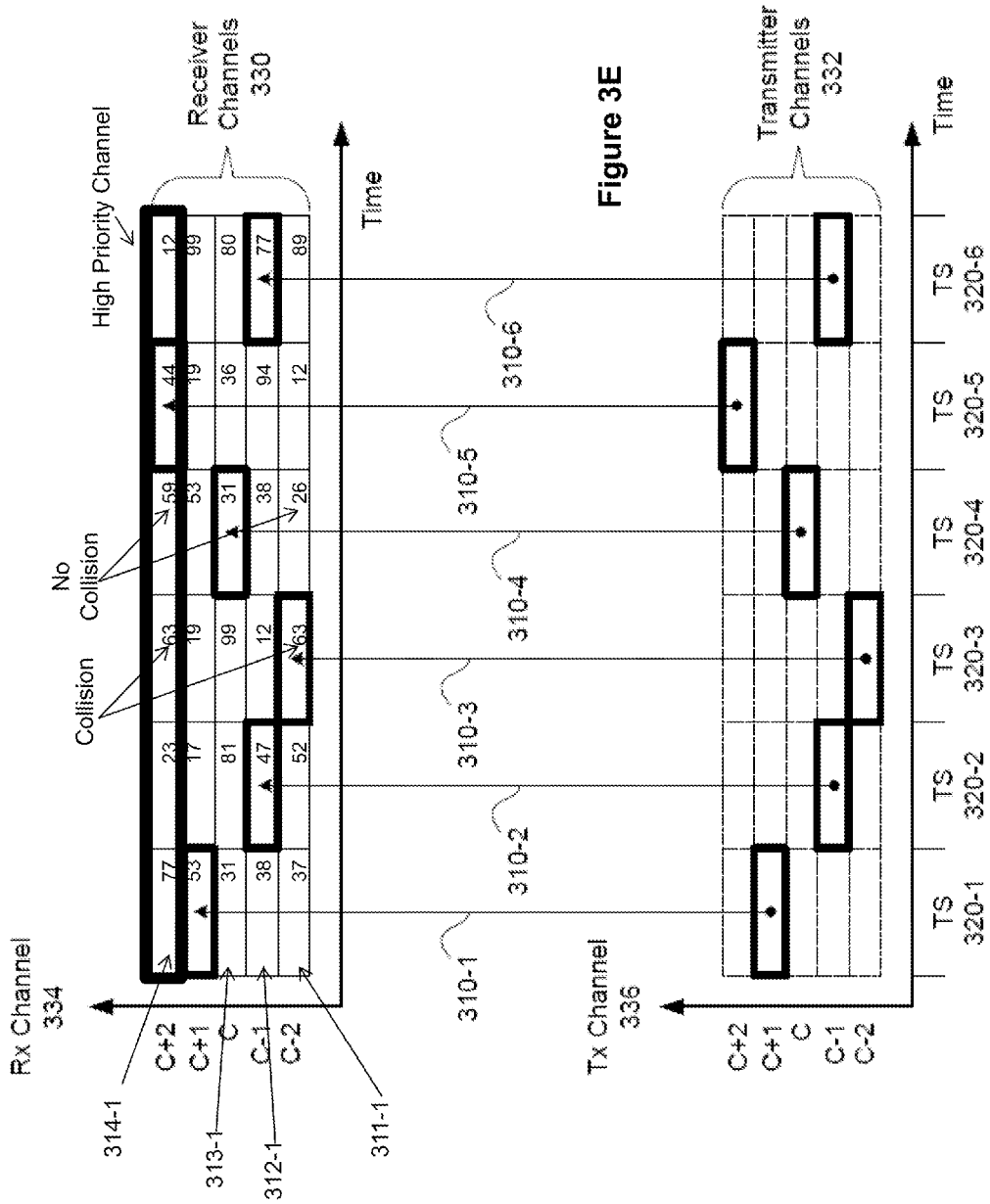
FIG. 3E illustrates prioritized frequency hopping transmission in a single transmitter/multiple receiver transceiver, according to one embodiment of the present invention.

With reference to FIG. 3E at time slot 320-1 where channel C+2 is dedicated to high priority traffic and channels C−2, C−1, C, and C+1 are dedicated to standard data, payload data 310-1, 311-1, 312-1, are 313-1 are standard messages, but payload data 314-1 is high priority data to which a transceiver 250 should dedicate its resources. Recall that in an embodiment, transceiver 250 has multiple receivers but has only one transmitter. Accordingly, if high priority message is going to require transmitting resources, transceiver 250 can dedicate its transmitting resources to react to the high priority payload data 314-1.

Figure 4:
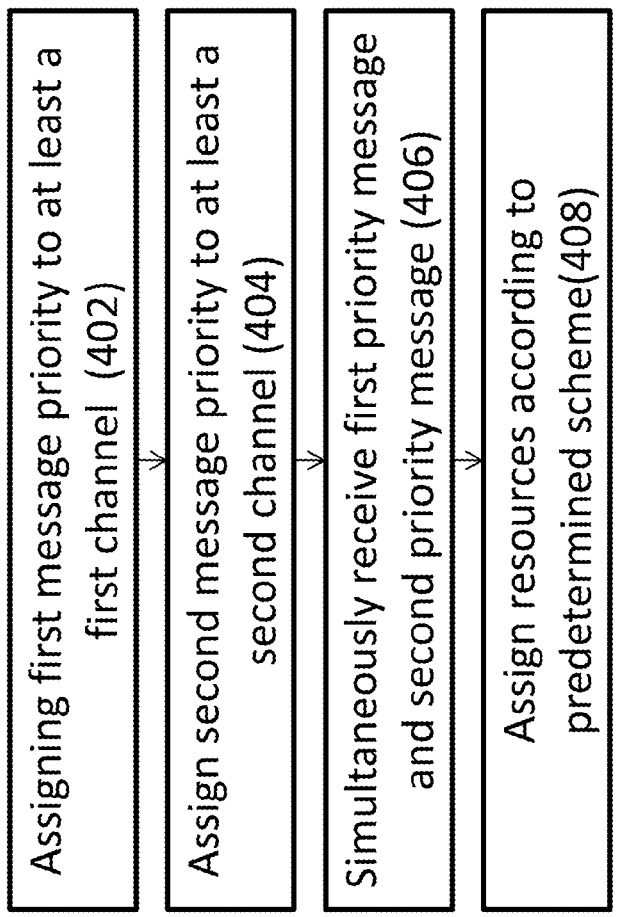
FIG. 4 is a flowchart depicting a method reserving channels for high priority packets according to an embodiment of the present invention.

An embodiment of the present invention for handling messages in a transceiver is shown in the flowchart of FIG. 4. Those of ordinary skill in the art, however, will understand that the scope of the present invention is in no way limited by the disclosed examples. For example, embodiments of the present invention may implement steps of the disclosed methods in a different order.

At step 402 as shown in FIG. 4, a first message priority is assigned to at least a first channel in a plurality of channels and at step 404 a second message priority is assigned to at least a second channel in the plurality of channels. The first message priority can be the high priority messages as was described with reference to FIG. 3E and the second priority messages can be the standard message as was described with reference to FIG. 3E. At step 406, a first priority message is received on the at least a first channel and simultaneously with a second priority message on the at least second channel. According to this embodiment of the present invention, resources are assigned to service the first priority message and the second priority message according to a predetermined scheme at step 408. Where the first priority messages need to be more urgently addressed, in particular predetermined scheme first priority messages are addressed first before any second priority messages are addressed. For example, where it may be necessary for a transceiver to respond by sending a message responsive to the first priority message, it is sent first before making any transmission to address the second priority messages. In another predetermined scheme, the various messages may be addressed randomly while addressing the first priority messages with higher probability (e.g., address first priority messages 90% of the time and second priority messages 10% of the time).

It should be noted that a high priority message may not occur at every time slot. Such that a receiver need only react to standard messages as known to those of ordinary skill in the art.

It should be further noted that although a well-designed system (e.g., Aloha) should experience very few transmission failure, an embodiment of the present invention, nonetheless, is able to identify the collision and assure proper transmission of the high priority data. For example, as shown in FIG. 3E, at time slot 320-3, standard channel C−2 and high priority channel C+2 transmit at the same frequency creating a transmission failure where it cannot be assured which data was received by the receiver, if any. In an embodiment of the invention, the transmitters associated with the standard data and the high priority data are able to calculate the occurrence of a transmission failure and are, therefore, aware of the transmission failure as it happens. Responsively, both transmitters can retry their transmissions in the next time slot, e.g., 320-4. Whereas transmission failures in a well-designed system occur with low probability, consecutive transmission failures occur with far less probability. Accordingly, even during a transmission failure situation, the receiver promptly receives the high priority data in a next time slot and can react to it immediately thereafter.

An embodiment of the invention with two levels of priority (e.g., standard and high priority) has been described with reference to FIG. 3E but the present invention is not so limited. In another embodiment where a transceiver maintains up to N orthogonal channel hopping sequences, up to N levels of priority can be assigned. For example, for a five channel Aloha system, up to five levels of priority can be implemented with each level of priority getting their own channel. Transceiver 250 could then be programmed to address the various priorities in order or according to any other desired scheme (e.g., address higher priority messages randomly but with higher probability).

In another embodiment where a transceiver maintains up to N orthogonal channel hopping sequences but it is desired to implement M levels of priority where M>N, the application layer is configured to map the M priorities onto the M available channels. In such an embodiment, the application layer can then communicate such mapping MLME discovery as would be known to those of ordinary skill in the art. For example, for a five channel Aloha system, up to five levels of priority can be implemented with each level of priority getting their own channel. Transceiver 250 could then be programmed to address the various priorities in order or according to any other desired scheme (e.g., address higher priority messages randomly but with higher probability).

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A method for handling messages in a Frequency Hopping Spread Spectrum (FHSS) transceiver, comprising:
   assigning a first message priority to at least a first receive channel in a plurality of FHSS channels;
   assigning a second message priority to at least a second receive channel in the plurality of FHSS channels;
   simultaneously receiving a first priority message on the at least a first receive channel and a second priority message on the at least a second receive channel; and
   assigning resources to service the first priority message and the second priority message according to a predetermined scheme by dedicating a first transmit channel in the plurality of FHSS channels, and allowing the first priority message to completely transmit in the first transmit channel prior to transmitting the second priority message in the first transmit channel.

2. The method of claim 1, wherein the first priority message and the second priority message are received by a single transmitter/multiple receiver transceiver.

3. The method of claim 2, wherein the first priority message is serviced ahead of the second priority message.

4. The method of claim 1, wherein the predetermined scheme includes first servicing the first priority message.

5. The method of claim 1, wherein the predetermined scheme includes servicing the first priority message with higher probability than the second priority message.

6. The method of claim 1, further comprising:
   assigning a third message priority to at least a third receive channel in the plurality of FHSS channels to a third priority of messages;
   receiving a third priority message on the at least a third receive channel simultaneously with receiving the first priority message and the second priority message; and
   assigning resources to service the third priority message according to the predetermined scheme when assigning resources to service the first priority message and the second priority message.

7. The method of claim 6, wherein the predetermined scheme includes first servicing the first priority message, then servicing the second priority message, and lastly servicing third priority message.

8. The method of claim 6, wherein the predetermined scheme includes servicing the first priority message with higher probability than the second priority message, and servicing the second priority message with higher probability than the third priority message.

9. A non-transitory computer-readable medium including instructions that, when executed by a processing unit, cause the processing unit to manage a transceiver, by performing the steps of:
   assigning a first message priority to at least a first receive channel in a plurality of Frequency Hopping Spread Spectrum (FHSS) channels;
   assigning a second message priority to at least a second receive channel in the plurality of FHSS channels;
   simultaneously receiving a first priority message on the at least a first receive channel and a second priority message on the at least a second receive channel; and
   assigning resources to service the first priority message and the second priority message according to a predetermined scheme by dedicating a first transmit channel in the plurality of FHSS channels, and allowing the first priority message to completely transmit in the first transmit channel prior to transmitting the second priority message in the first transmit channel.

10. The computer-readable medium of claim 9, wherein the first priority message and the second priority message are received by a single transmitter/multiple receiver transceiver.

11. The computer-readable medium of claim 10, wherein the first priority message is serviced ahead of the second priority message.

12. The computer-readable medium of claim 9, wherein the predetermined scheme includes first servicing the first priority message.

13. The computer-readable medium of claim 9, wherein the predetermined scheme includes servicing the first priority message with higher probability than the second priority message.

14. The computer-readable medium of claim 9, further comprising:
   assigning a third message priority to at least a third receive channel in the plurality of FHSS channels to a third priority of messages;
   receiving a third priority message on the at least a third receive channel simultaneously with receiving the first priority message and the second priority message; and
   assigning resources to service the third priority message according to the predetermined scheme when assigning resources to service the first priority message and the second priority message.

15. The computer-readable medium of claim 14, wherein the predetermined scheme includes first servicing the first priority message, then servicing the second priority message, and lastly servicing third priority message.

16. The computer-readable medium of claim 14, wherein the predetermined scheme includes servicing the first priority message with higher probability than the second priority message, and servicing the second priority message with higher probability than the third priority message.

17. A wireless network device, comprising:
a transceiver circuit comprising a single transmitter configured to generate a radio signal based on a carrier signal and multiple receivers configured to receive radio signals based on a carrier signal; and
a signal processing unit that is coupled to the transceiver circuit and configured to:
  assign a first message priority to at least a first receive channel in a plurality of Frequency Hopping Spread Spectrum (FHSS) channels;
  assign a second message priority to at least a second receive channel in the plurality of FHSS channels;
  simultaneously receive a first priority message on the at least a first receive channel and a second priority message on the at least a second receive channel; and
  assign resources to service the first priority message and the second priority message according to a predetermined scheme by dedicating a first transmit channel in the plurality of FHSS channels, and allowing the first priority message to completely transmit in the first transmit channel prior to transmitting the second priority message in the first transmit channel.

18. The wireless network device of claim 17, wherein the first priority message and the second priority message are received by a single transmitter/multiple receiver transceiver.

19. The wireless network device of claim 18, wherein the first priority message is serviced ahead of the second priority message.

20. The wireless network device of claim 17, wherein the predetermined scheme includes first servicing the first priority message.

21. The wireless network device of claim 17, wherein the predetermined scheme includes servicing the first priority message with higher probability than the second priority message.

22. The wireless network device of claim 17, wherein the signal processing unit is further configured to:
  assign a third message priority to at least a third receive channel in the plurality of FHSS channels to a third priority of messages;
  receive a third priority message on the at least a third receive channel simultaneously with receiving the first priority message and the second priority message; and
  assign resources to service the third priority message according to the predetermined scheme when assigning resources to service the first priority message and the second priority message.

23. The wireless network device of claim 22, wherein the predetermined scheme includes first servicing the first priority message, then servicing the second priority message, and lastly servicing third priority message.

24. The wireless network device of claim 22, wherein the predetermined scheme includes servicing the first priority message with higher probability than the second priority message, and servicing the second priority message with higher probability than the third priority message.

* * * * *